US007765658B2

(12) United States Patent
Piccioni

(10) Patent No.: US 7,765,658 B2
(45) Date of Patent: Aug. 3, 2010

(54) BLADE TIP GRINDING TOOLING

(75) Inventor: Eric Piccioni, Chambly (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1325 days.

(21) Appl. No.: 11/250,521

(22) Filed: Oct. 17, 2005

(65) Prior Publication Data

US 2007/0084053 A1 Apr. 19, 2007

(51) Int. Cl.
*B21D 53/78* (2006.01)
*B23Q 3/00* (2006.01)

(52) U.S. Cl. .......................... 29/23.51; 29/559; 29/464; 29/889.22; 29/889.21; 29/889.1; 269/268; 269/287; 269/270; 269/909

(58) Field of Classification Search ................ 29/23.51, 29/559, 464, 889.21, 889.1, 889.2, 889.22; 269/287, 268, 269, 270, 909
See application file for complete search history.

(56) References Cited

U.S. PATENT DOCUMENTS

| | | | | |
|---|---|---|---|---|
| 2,438,867 A | 3/1948 | Rockwell et al. | | |
| 2,730,794 A | 1/1956 | Schorner | | |
| 3,275,794 A * | 9/1966 | Dubusker et al. | | 219/125.1 |
| 3,546,817 A | 12/1970 | Schaller et al. | | |
| 4,034,182 A * | 7/1977 | Schlosser et al. | | 219/121.14 |
| 4,501,095 A | 2/1985 | Drinkuth et al. | | |
| 4,512,115 A | 4/1985 | Miller | | |
| 4,566,225 A | 1/1986 | Bizot et al. | | |
| 4,884,951 A | 12/1989 | Meylan et al. | | |
| 5,191,711 A | 3/1993 | Vickers et al. | | |
| 5,414,929 A | 5/1995 | Flöser et al. | | |
| 5,544,873 A * | 8/1996 | Vickers et al. | | 269/47 |
| 5,704,826 A | 1/1998 | Vizcaino | | |
| 5,867,885 A | 2/1999 | Bales et al. | | |
| 7,469,452 B2 * | 12/2008 | Garrett | | 29/23.51 |

FOREIGN PATENT DOCUMENTS

| | | |
|---|---|---|
| DE | 3402066 A1 | 8/1985 |
| DE | 3512569 A1 | 10/1986 |
| EP | 0 486 131 | 5/1992 |
| SU | 614897 | 6/1978 |
| WO | WO 00/09861 A2 | 2/2000 |

OTHER PUBLICATIONS

International Search Report dated Jan. 26, 2007 for corresponding PCT International Application No. PCT/CA2006/001689.
European Patent Office Search Report dated Feb. 9, 2007 for corresponding European Patent Application No. 06255347.4-1262.

* cited by examiner

*Primary Examiner*—David P Bryant
*Assistant Examiner*—Sarang Afzali
(74) *Attorney, Agent, or Firm*—Ogilvy Renault LLP

(57) ABSTRACT

A fixture assembly for securely positioning a plurality of blades loosely assembled on to a rotor of a gas turbine engine in which axial clamping forces are translated to apply radial expansion forces on the blades to simulate a centrifugal force on the blades during engine operation.

26 Claims, 5 Drawing Sheets

BLADE TIP GRINDING TOOLING

TECHNICAL FIELD

The invention relates generally to gas turbine engines, and more particularly, to an improved apparatus and method for manufacturing compressor and turbine rotor assemblies as utilized in gas turbine engines.

BACKGROUND OF THE ART

A compressor or turbine rotor assembly for gas turbine engines, includes a plurality of compressor or turbine blades mounted to the outer periphery of a central rotor. It is important in gas turbine engines that the outer tips of the compressor or turbine blades run very close to surrounding shrouds in order to minimize gas leakage across the tips of the blades. Machining of such compressor or turbine blade tips to the desired outer true tip diameter, is a difficult manufacturing operation because the blades are normally retained with root sections loosely fitting within dovetail grooves in the rotor at the periphery thereof. Prior art fixture tools use radial expansion of resilient materials under axial compression forces for simulating the centrifugal force created during engine operation, to radially position the blades during a machining process. In such a prior art method, it is difficult to accurately control the quantity, acting points, and even distribution of radial forces acting on the individual blades. Therefore, the results are often unsatisfactory. In another prior art machining method, the rotor assembly is rotated at a high speed, resulting in a centrifugal force for positioning the blades within the slots of the rotor in a blade tip machining process. The high speed rotation of the rotor disc during the machining process is however, not desirable due to various concerns such as safety, convenience, cost of the manufacturing process, etc.

Accordingly, there is a need to provide an improved apparatus and method for machining blade tips as used in gas turbine engines.

SUMMARY OF THE INVENTION

It is therefore an object of this invention to provide an apparatus and method for machining blade tips of a rotor assembly used for gas turbine engines.

In one aspect, the present invention provides a fixture assembly for positioning a plurality of blades relative to a rotor of a gas turbine engine, the blade being retained therein by loose-fitting dovetail joints. The blades have a dovetail root, an airfoil and a transversely extending platform therebetween. The fixture assembly comprises a support for holding said rotor having the blades mounted thereto, and first and second positioning members. The first positioning member has a blade engagement portion for contacting a first portion of each blade platform protruding axially relative to the rotor. The second positioning member is disposed so as to be on an opposite axial side of the rotor when the rotor is mounted in the support. The second positioning member has a blade engagement portion for contacting a second portion of each blade platform protruding axially relative to the rotor. The second portion of each blade platform is opposite to the first portion. There is a centrally actuatable clamping assembly substantially coaxial to a rotor axis for axially clamping the first and second positioning members together when the rotor is mounted in the support. The first and second positioning members are adapted to transmit a pair of radial forces on the respective first and second portions of each of the blade platforms for radially positioning the blades outwardly against the rotor, thereby simulating a centrifugal force resulting from rotor rotation about said rotor axis.

In another aspect, the present invention provides a fixture assembly for a rotor assembly which includes a rotor disc having an axis of rotation and a plurality of airfoil blades mounted to a periphery of the rotor by respective loose-fitting dovetail joints. The fixture assembly comprises an axle adapted to centrally support the rotor assembly, and first and second clamping members associated with the axle. The clamping members are adapted to be moved towards one another to thereby provide a clamping force therebetween. There are first and second concave assemblies mounted to the axle and positioned such that a central concave surface of each concave assembly faces the rotor. The concave assemblies are disposed on opposite sides of the rotor relative to one another and the first and second concave assemblies each extend from the axle to engage opposite sides of the airfoil blades at respective peripheries of the first and second concave assemblies. The first concave assembly is associated with the first clamping member and the second concave assembly is associated with the second clamping member. When a rotor assembly is installed in the fixture assembly, movement of the clamping members towards one another tends to reduce respective concavities of the first and second concave assemblies and thereby generate an upwardly-directed radial force at the respective peripheries of the first and second concave assemblies in order to radially secure the airfoil blades relative to the rotor disc.

In another aspect, the present invention provides a method of machining rotor assembly blade tip outer diameters. The rotor assembly has an annular array of blades mounted to an outer periphery of a rotor via loose-fitting dovetail joints and the blades each have platforms protruding axially from both sides of the rotor. The method comprises (a) positioning a pair of generally cone-like members which extend from a common axis to a platform engaging surface; (b) positioning the cone-like members with respect to the rotor assembly to locate a portion of each of the cone-like members in a predetermined angular position relative to the blade platforms, one cone-like member on each axial side of the rotor so that opposed sides of each platform are engaged by the first and second cone-like members respectively; (c) radially positioning the blade with respect to the rotor by applying substantially even radial expansion forces to the individual blade platforms by applying an axial compressive on the cone-like members towards one another; and then (d) machining outer tips of the blades.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
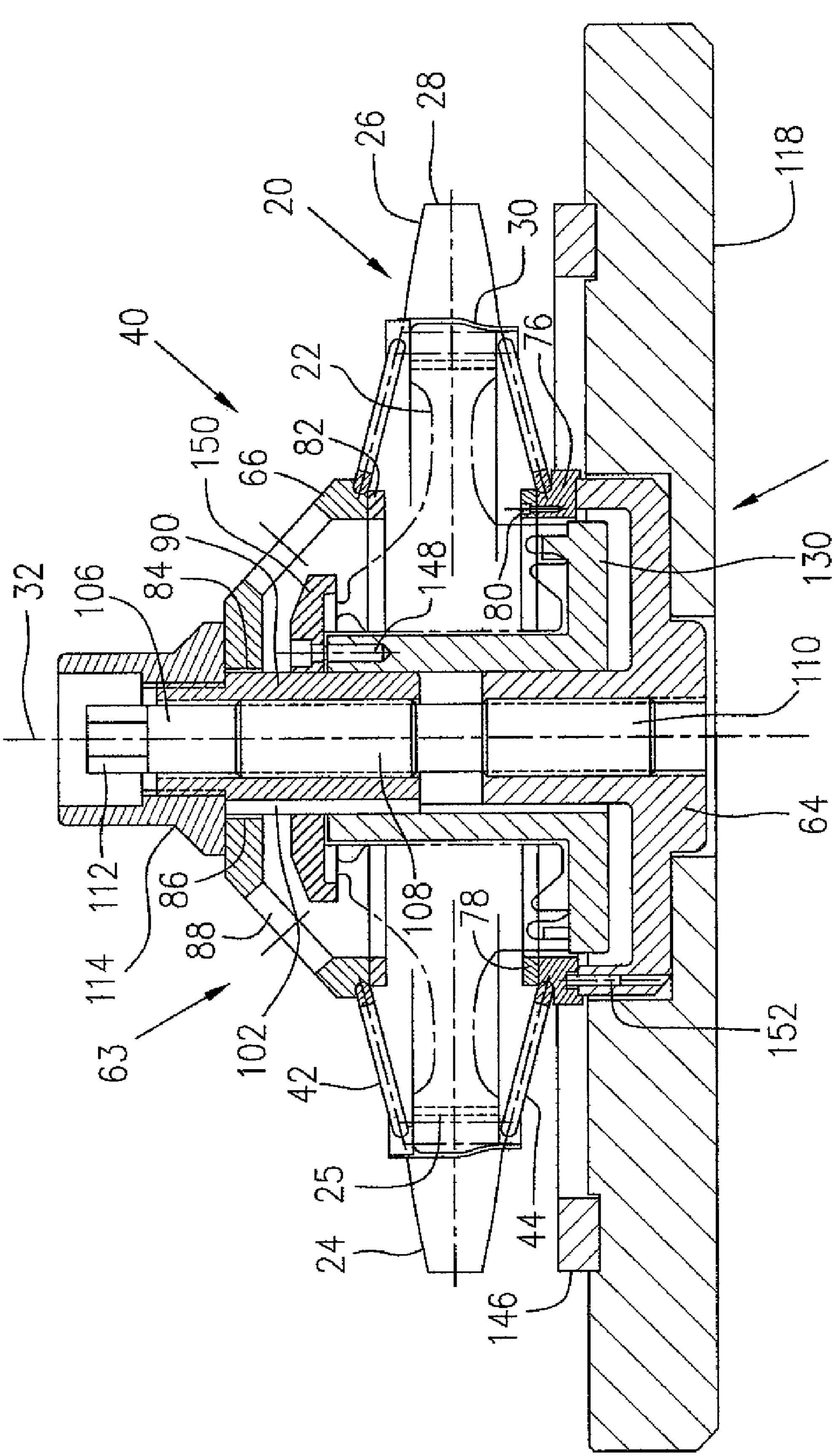
FIG. 1 is a cross-sectional view of a fixture assembly for applying radial expansion forces to blades loosely mounted upon a periphery of a rotor in a machining process, according to one embodiment of the present invention.
Figure 2:
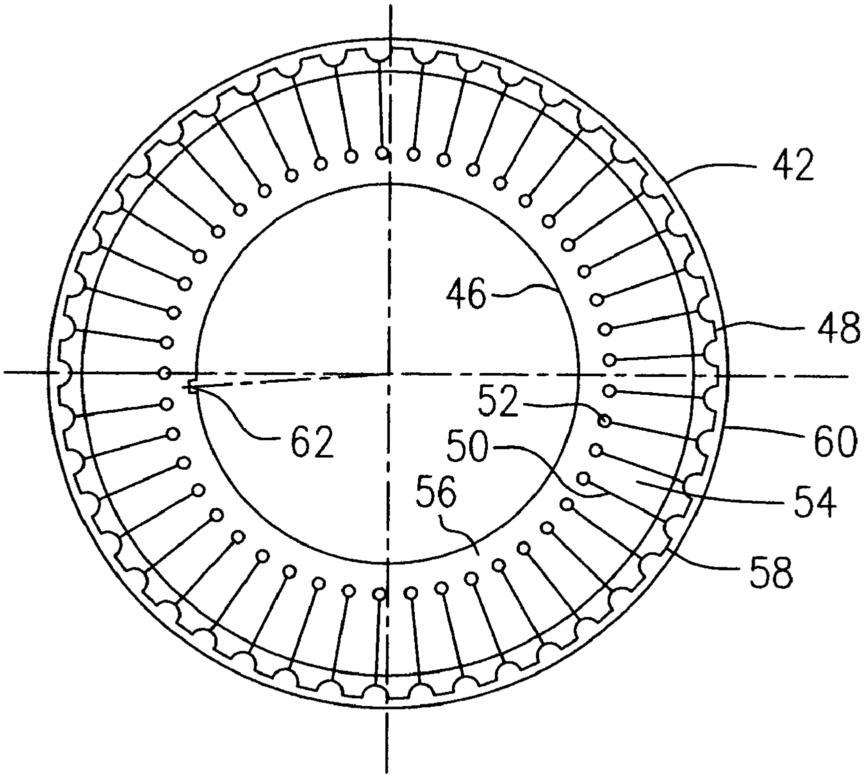
FIG. 2 is a top plane view of a disc spring used in the fixture assembly of FIG. 1.
Figure 3:
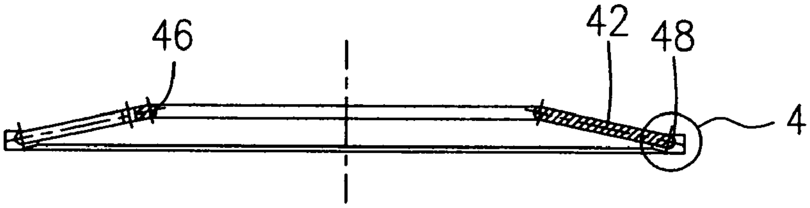
FIG. 3 is a cross-sectional view of the disc spring of FIG. 2.
Figure 4:
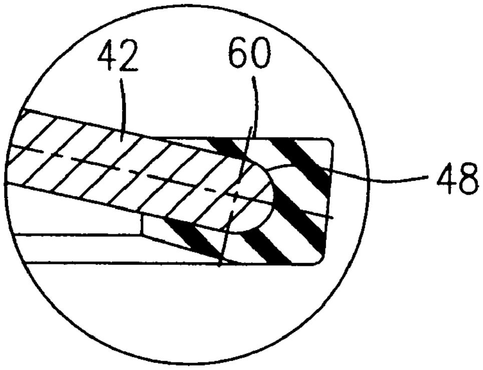
FIG. 4 is an enlarged partial cross-sectional view of the disc spring of FIG. 3, in the circled area indicated by numeral 4, showing a resilient layer attached to the outer periphery of the disc spring.
Figure 5:
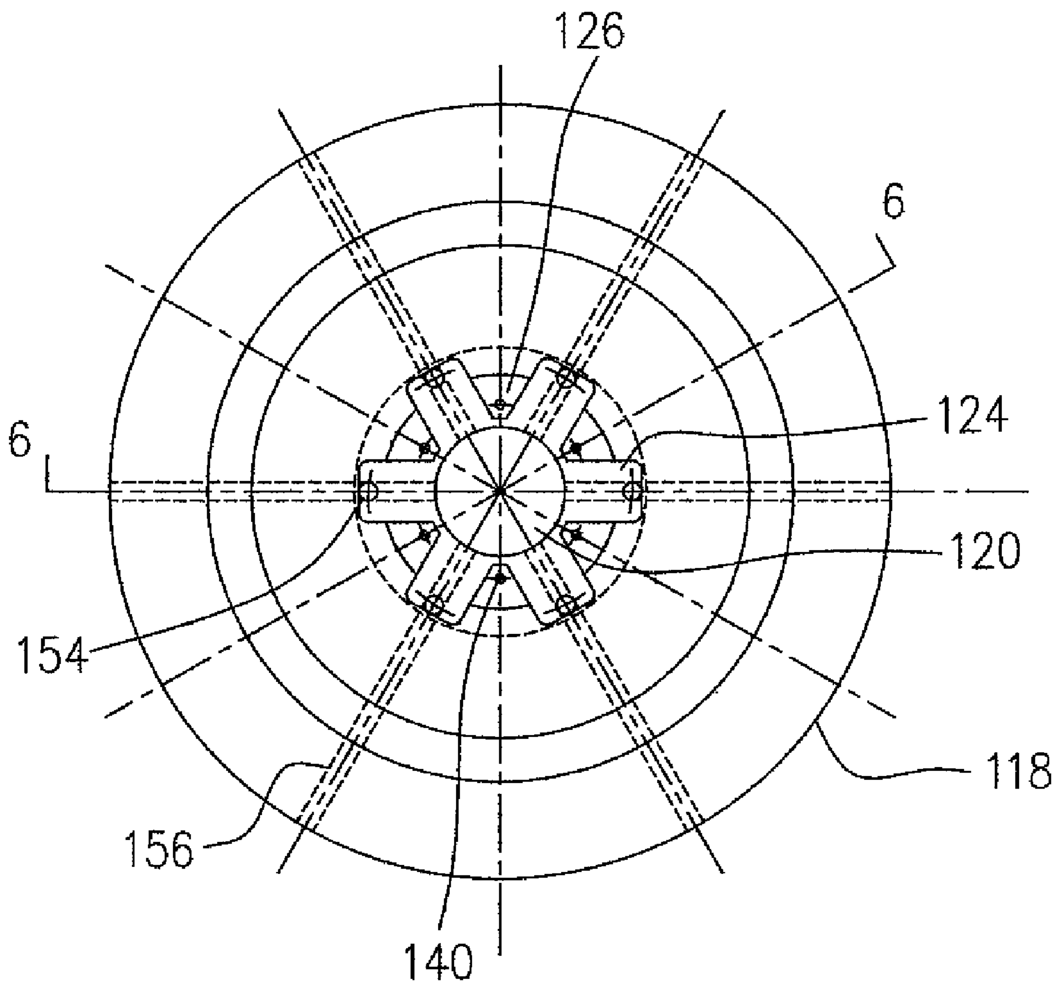
FIG. 5 is a top plane view of a base plate of the fixture assembly of FIG. 1.
Figure 6:
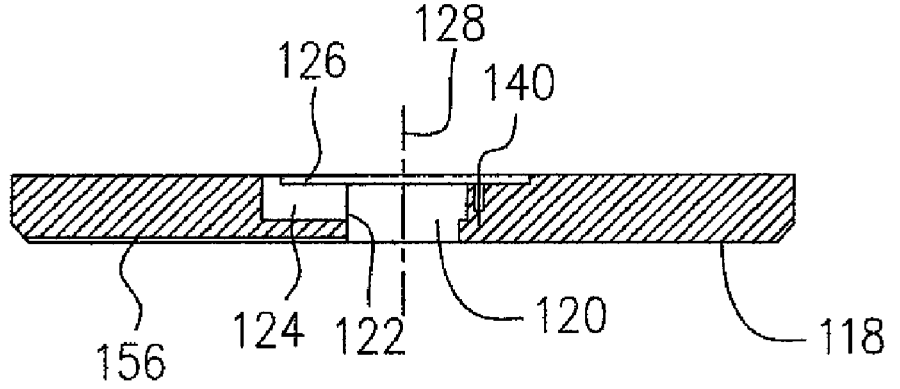
FIG. 6 is a cross-sectional view of the base plate taken along line 6-6 in FIG. 5 showing a central cavity defined therein.

Referring to FIG. 1, a typical axial turbine or compressor rotor assembly (in broken lines) is generally denoted by the numeral 20 and includes a central rotor 22 having a central through bore (not indicated), an outer periphery (not indicated), and a plurality of dovetail configured grooves 25 extending axially through the rotor 22 and disposed generally in the outer periphery thereof. Turbine or compressor blades 24 (generally referred to as blades hereinafter) are carried upon the outer periphery of the rotor 22. Each blade 24 includes a radially and outwardly extending airfoil 26 having an outer tip 28, a platform 30, and a root section (not indicated) which is complimentarily configured to be received within the dovetail groove 25 of the rotor 22. Each blade 24 is assembled upon rotor 22 by axial insertion into the dovetail groove 25 of the rotor 22. The root section of each blade 24 is loosely received in the dovetail groove of the rotor 22. Loose mounting is necessary not only to facilitate assembly, but also to allow for necessary tolerances because of different thermal growth between the blade 24 and the rotor 22 during operation of a gas turbine engine in which the rotor assembly 20 is installed.

As so mounted upon the rotor 22, the blades 24 are not necessarily disposed in the "running" position, that is, the positions the blades 24 take under centrifugal forces created thereon during operation of the gas turbine engine. Furthermore, the diameter of each of the blade tips 28 relative to a central axis 32 of the rotor 22, varies due to manufacturing tolerance build-up. Therefore, it is desirable to machine the tips 28 when the blades 24 are assembled upon the rotor 22 and held in the "running" position in order to obtain a desired outer diameter of the rotor assembly 20.

In accordance with one embodiment of the present invention, a fixture assembly 40 is contemplated to provide tooling for machining the tips 28 of the rotor assembly 20 in a machining process.

The fixture assembly 40 includes a first disc spring 42 and a second disc spring 44, preferably forming first and second toggle joint devices in order to convert a pair of substantially balanced axial compressive forces into a pair of substantially balanced radial expansion forces acting on opposite axial sides of each blade 24, thereby firmly radially positioning the blade 24 with respect to the rotor 22. The disc springs 42, 44 are preferably similar and therefore only disc spring 42 will be described in detail for convenience of description.

Referring to FIGS. 1-4, disc spring 42 is preferably formed as a skirt-shaped metal ring extending axially and radially between inner and outer peripheries 46, 48 thereof. The disc spring 42 further includes a plurality of circumferentially spaced cuts 50 through the thickness thereof. The cuts 50 extend radially and inwardly from the outer periphery 48 of the disc spring 42, and preferably terminate at respective through holes 52 which are preferably located radially and equally close to the inner periphery 46. Thus, each portion between two adjacent cuts 50 forms an arm 54 of a toggle joint device in which the respective arms 54 are integrated at the inner ends thereof with a ring portion 56. The number of cuts 50 is preferably equal to the number of blades 24 of the rotor assembly 20 such that when the disc spring 42 is disposed on one axial side of the rotor 22 and the blades 24, each arm 54 extends axially, radially and outwardly toward one of the blades 24. Each arm 54 preferably has an outer end 58 thereof narrower than the width of the axially protruding portion of the platform 30 of the blade 24. Thus, the positions of the respective arms 54 are circumferentially adjustable with respect to the corresponding blades 24, without interference with adjacent blades when each arm 54 converts an axial force into a radial expansion force on the corresponding blade 24. In this embodiment, a plurality of semi-circular cut-outs (not indicated) are made on the outer periphery 48 of the disc spring 42, substantially aligning with the respective cuts 50, in order to achieve narrowed outer ends 58 of the arms 54.

It is preferable to provide a resilient layer such as urethane rubber of similar material, on the outer end 58 of each arm 54 in order to ensure firm contact between each arm 54 and the axially protruding portion of the platform 30 of each blade 24. In this embodiment, the resilient layers on the outer ends 58 of the respective arms 54 are connected with the layers on the adjoining arms 54 to form an integral outer ring 60 of resilient material attached to the outer periphery 48 of the disc spring 42. The layer is preferably shaped to complimentarily receive the protruding portions of the blade platforms.

The disc spring 42 further preferably includes an angularity positioning element, for example a small radial recess or slot 62 defined in the inner periphery 46 at a predetermined angular location. This will be further described hereinafter.

Disc springs 42, 44, thus function as toggle joint devices with the outer periphery 48 and the resilient layer 60 thereon in contact with the axial protruding portion of the platform 30 of each blade 24 at the respective opposite sides thereof.

In FIGS. 1, and 5-11, a clamping device 63 is operatively connected to the disc springs 42, 44 for controllably applying a pair of substantially balanced axial compressive forces thereonto. The clamping device 63 includes a lifting member 64 to be positioned on one side of the rotor 22, for example, on the bottom side in this embodiment, and a top clamping cover 66 to be disposed on the other axial side of the rotor 22, such as the top side thereof, for applying a pair of opposite axial forces to the respective disc springs 42, 44.

Figure 9:
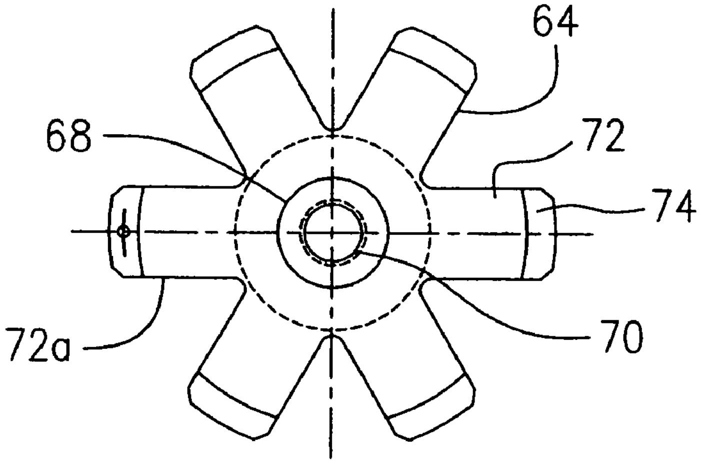
FIG. 9 is a top plane view of a lifting member used in the fixture assembly of FIG. 1.
Figure 10:
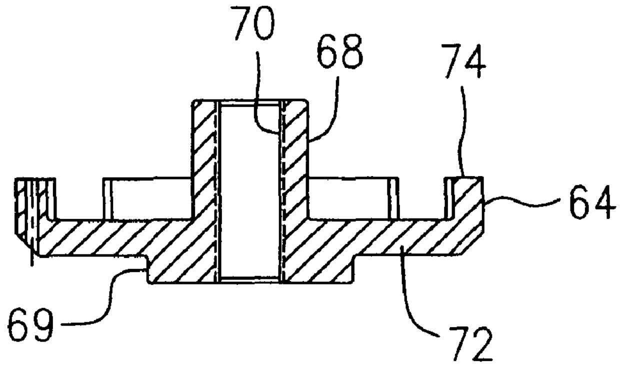
FIG. 10 is a cross-sectional view of the lifting member of FIG. 9.

In particular, the lifting member 64 which is better illustrated in FIGS. 9 and 10, includes a hollow cylindrical body 68 with inner threads 70, and preferably has a bottom section 69 with an enlarged diameter. The lifting member 64 further includes a plurality of arms 72 extending radially outwardly from the cylindrical body 68. Each arm 72 has a finger member 74 protruding axially and upwardly from the outer end thereof. The finger members 74 preferably support a support ring 76 (see FIG. 1) resting thereon in a horizontal position. The support ring 76 includes a lower portion (not indicated) having an outer diameter greater than the diameter of the inner periphery of the disc spring 44 and an upper portion (not indicated) having an outer diameter slightly smaller than the diameter of the inner periphery of the disc spring 44, thereby providing a shoulder configuration to support the disc spring 44. It is further preferable to provide a ring 78 having an outer diameter slightly greater than the diameter of the inner periphery of disc spring 44, which is detachably mounted to the support ring 76 using mounting screws 80 such that the support ring 76 is attached to the inner periphery of the disc spring 44 for convenience of mounting the rotor assembly 20 into the fixture assembly 40.

The top clamping cover 66 is formed for example, like an inverted bowl having flat upper and lower ends (not indicated) thereof. The top clamping cover 66 defines a shoulder configuration at the lower end thereof similar to the shoulder configuration of the support ring 76, in order to maintain contact with the disc spring 42 at the inner periphery 46 thereof. A ring 82 having an outer diameter slightly greater than the diameter of the inner periphery 46 of the disc spring 42 is preferably attached to the lower end of the top clamping cover 66 using mounting screws (not shown) such that the top clamping cover 66 is detachably attached to the disc spring 42 for convenience of mounting the rotor assembly 22 into the fixture assembly 40. The top clamping cover 66 further includes a central opening 84 with a key slot 86. A plurality of apertures 88 are preferably provided in the top clamping cover 66.

Figure 11:
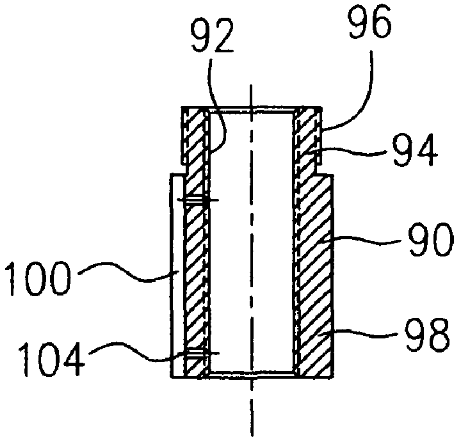
FIG. 11 is a cross-sectional view of a top sleeve member used in the fixture assembly of FIG. 1.

The clamping device 63 further includes a sleeve member 90 which is also shown in FIG. 11, with inner threads 92. The sleeve member 90 includes an upper portion 94 having outer threads 96, and a lower portion 98 having an axial key slot 100 for receiving a key 102 therein. The key 102 is secured by mounting screws (not shown) fastened within threaded mounting holes 104 in the lower portion 98 of the sleeve member 90. The upper portion 94 of the sleeve member 90 preferably has a diameter smaller than the diameter of the lower portion 98 thereof.

The clamping device 63 is further provided with an actuating screw 106 which extends through the rotor 22 and includes upper and lower threaded sections 108, 110 having complimentary threads with respect to the respective inner threads of the sleeve member 90 and the lifting member 64. The inner threads 92 of the sleeve member 90 and the inner threads 70 of the lifting member 64, as well as the complimentary threads of the respective upper and lower threaded sections 108, 110 are in opposite directions such that when the actuating screw 106 rotates relative to the sleeve member 90 and the lifting member 64, the sleeve member 90 and the lifting member 64 are forced to move towards or away from each other. The actuating screw 106 preferably includes a top head section 112 in a hexagonal configuration, for engagement with a tool (not shown) for turning the actuating screw 106.

A top nut 114 is provided to engage with the outer threads 96 of the sleeve member 90 in order to retain the top clamping cover 66 to move together with the sleeve member 90 towards the lifting member 64. The sleeve member 90 and the cylindrical body 68 of the lifting member 64 have an outer diameter which is significantly smaller than the central bore of the rotor 22, thereby allowing the respective sleeve member 90 and the cylindrical body 68 of the lifting member 64 to be loosely inserted into the central bore of the rotor 22 from opposite sides thereof, which will be further described hereinafter.

The fixture assembly 40 further preferably includes a base structure 116 for operatively supporting the clamping device 63 and for securely supporting the rotor assembly 20 in the fixture assembly 40. The base structure 116 includes for example, a base plate 118 which is illustrated in detail in FIGS. 5 and 6. The base plate 118 defines a central cavity 120 which includes a central bore 122 extending through the base plate 118 and having diameter greater than the enlarged bottom section 69 of the lifting member 64, for loosely receiving same therein. The central bore 122 has an enlarged upper portion forming a recess 124 comprising radially extending grooves (not indicated) for accommodating the arms 72 and fingers 74 of the lifting member 64. The recess 124 is sized to allow a slight radial movement of the lifting member 64 therein when the lifting member 64 is received in the cavity 120 with the arms 72 thereof resting on the bottom of the radially extending grooves of the recess 124. It is preferable to restrict circumferential movement of the lifting member 64 with respect to the base plate 118. In this embodiment, this is achieved for example, by a precise fit in width of one of the arms 72 which is particularly denoted as the arm 72*a* (see FIG. 9) in the corresponding radially extending groove of the recess 124. The widths of the other grooves are sized to loosely receive the remaining arms 72. Shallow sectorial recesses 126 are defined on the lands (not indicated) between the radially extending grooves of the recess 124 and are symmetrical about a central axis 128 of the central bore 122.

The base plate 118 preferably further includes bores 154 located in the grooves of the recess 124 and extending axially through the base plate 118, and channels 156 defined in the bottom of the base plate 118 and extending radially between the individual bores 154 and the outer periphery (not indicated) of the base plate 118, thereby forming fluid passages to discharge the cooling and lubricating fluids from the cavity 120 of the base structure 116 during a machining process.

Figure 7:
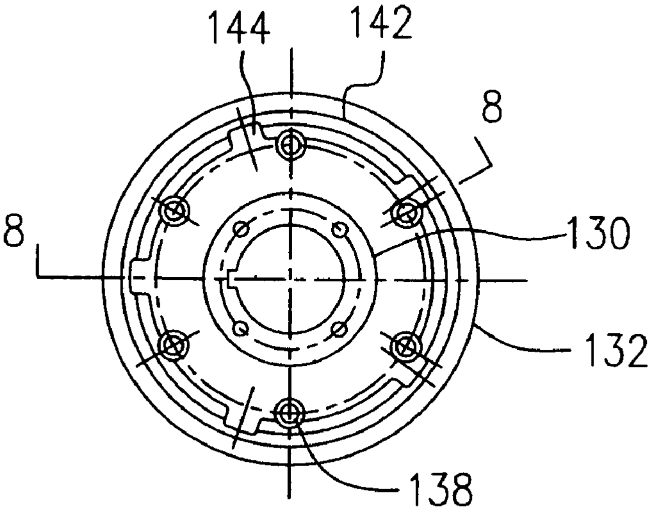
FIG. 7 is a top plane view of a central sleeve to be attached to the base plate of FIGS. 5-6 in order to form a base structure of the fixture assembly.
Figure 8:
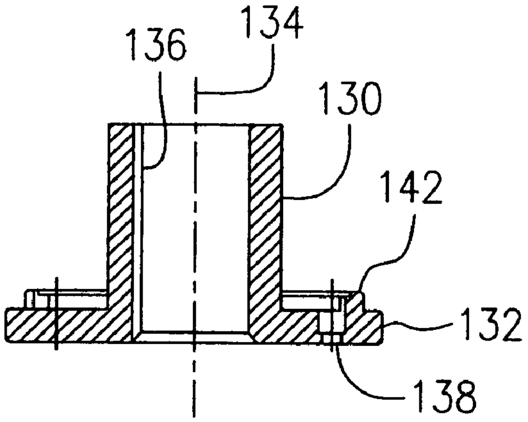
FIG. 8 is a cross-sectional view of the central sleeve taken along 8-8 in FIG. 7.

The base structure 116 further includes a central sleeve 130 which is better illustrated in FIGS. 7-8 and is provided with a radial flange 132 at the bottom end thereof. The flange 132 is substantially perpendicular to a central axis 134 of the central sleeve 130, in order to provide a support and accurate position to the rotor 22. The central sleeve 130 has an outer diameter to precisely fit with the central bore of the rotor 22 such that the rotor 22 is positioned coaxially with the sleeve 130 when the rotor 22 is supported on the radial flange 132 and accommodates the central sleeve 130 within the central bore thereof. The central sleeve 130 defines a key groove 136 axially extending on an inner surface (not indicated) through the central sleeve 130. The inner surface of the central sleeve 130 is sized to loosely receive the sleeve member 90 and the cylindrical body 68 of the lifting member 64 and to allow not only relative axial movement but also radial adjustment of the sleeve member 90 and the cylindrical body 68 of the lifting member 64, therein. The central sleeve 130 rests on the bottom of the sectorial recesses 126 (see FIGS. 5-6) and is secured to the top of the base plate 118, by mounting screws (not shown) through mounting bores 138 in the radial flange 132 of the central sleeve 130, which engage with screw bores 140 in the base plate 118. The radial flange 132 of the central sleeve 130 is configured in diametrical size to fit precisely within the sectorial recess 126 in the base plate 118 such that the central sleeve 130 is positioned coaxially with the base plate 118. When the central sleeve 130 is secured to the base plate 118, the central space defined within the central sleeve 130 and the central cavity 120 defined in the base plate 118, in combination, define a cavity (not indicated) for accommodating the lifting member 64 therein, thereby allowing a limited axial movement and limited radial adjustment thereof within the cavity.

The radial flange 132 of the central sleeve 130 preferably further includes an axially extending ring 142 with a plurality of circumferentially spaced slots 144 therein, sized and positioned in accordance with the mating members on, for example, the bottom side of the rotor 22. Those mating members of rotor 22 mate with the rotor of adjacent stages for transferring torque between the adjacent rotors. The mating members are received in the slots 144 when the rotor 22 is supported on the radial flange 132 of the central sleeve 130 such that the angular relationship between the rotor assembly 20 and the base structure 116 is determined.

The base structure 116 is further provided with a central top plate 150 defining a central opening (not indicated) with a key slot (not indicated). The central top plate 150 abuts the top side of the rotor 22 which does not have the mating members, and is secured to the central sleeve 130 at the top end thereof by mounting screws 148 such that the rotor assembly 20 is securely affixed to the base structure 116. The central opening with a key slot of the central top plate 150 allows the sleeve member 90 with attached key 102 to be loosely moveable through the central top plate 150 into the central sleeve 130. Although the rotor assembly 20 is securely affixed to the base structure 116, the disc springs 42, 44 as well as the contacted clamping device 63 which includes the top clamping cover 66 with ring 82, sleeve member 90 and the lifting member 64 with the support ring 76 and ring 78 interconnected by the actuating screw 106, are loosely and operatively retained by the base structure 116 when the disc springs 42, 44 are disposed on the respective bottom and top sides of the rotor assembly 22, prior to a pair of axial forces being applied to the respective disc springs 42, 44. Thus, the disc springs 42, 44 with the clamping device 63 are adjustable about the coaxially positioned central axis 128 of the base plate 118, axis 134 of the central sleeve 130 and axis 32 of the rotor 22. This feature provides an advantage for self-centering of the respective disc springs 42, 44 about the central axis 32 of the rotor 22 in order to ensure appropriate contact with the axially protruding portions of the platform 30 of the blades 24 in compensation for tolerance stackup of both the root assembly 20 and the fixture assembly 40.

The base structure 116 preferably further includes a gauging ring 146 which is secured to the top of the base plate 118 by mounting screws (not shown). The gauging ring 146 is positioned precisely and coaxially with the base plate 118, and has a precisely machined outer periphery with a predetermined diameter thereof in order to provide a measurement reference for the outer diameter of the tips 28 of the blades 24.

Figure 12:
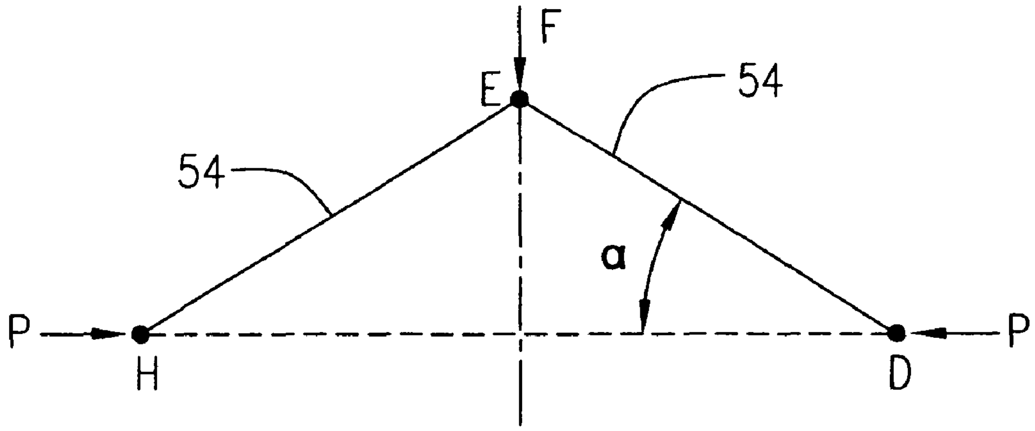
FIG. 12 is a diagram showing a working principle of the toggle joint devices used in the fixture of assembly of FIG. 1.

As described above, the disc springs 42, 44 function as toggle joint devices with each arm 54 acting as a toggle joint. The working principle of toggle joints are briefly discussed with reverence to FIG. 12. In FIG. 12 EH and ED represent a pair of diametrically opposite arms 54 of the disc spring 42, of FIG. 2. F is an axial force acting on the pair of arms 54 and P is the resistance force acting on the arms 54. P is expressed as below:

$$P = F \times \text{coefficient, wherein coefficient} = \cos \alpha/2 \sin \alpha.$$

When the angle α is predetermined, the radial expansion forces which are equivalent to the resistance forces P applied by the toggle joints, can be applied with relative accuracy by controlling the applied axial force F, which can be conveniently achieved by using a torque gauge when applying torque to the actuating screw 106 of FIG. 1.

Referring again to FIGS. 1-3, it is desirable to position the respective disc springs 42, 44 in a predetermined angular relationship with the rotor assembly 20 such that the radial expansion forces applied by a pair of arms 54 of the respective disc springs 42, 44 to each blade 24, result in a total radial expansion force acting substantially through a gravitational center of each blade 24 to simulate the centrifugal force acting on the blade during a working condition of the rotor assembly 20. In order to achieve such a predetermined angular position, the fixture assembly 40 preferably includes a plurality of angularity positioning elements disposed between the respective disc springs 42, 44 and the clamping device 63, and between adjacent parts of the clamping device 63. For example, a positioning pin (not shown) can be attached to the respective top clamping cover 66 and support ring 76 and can protrude radially to be appropriately fit into the slot 62 in the inner periphery 46 of the respective disc springs 42, 44. The support ring 76 further preferably provides a positioning recess (not indicated) appropriately fitted with a positioning pin 152 inserted in a positioning hole (not indicated, see FIG. 9) in the finger of the arm 72*a* of the lifting member 64. Therefore, a complete chain of angularity positioning elements from the disc spring 42 to the base structure 116 is achieved because the angular relationship between the top clamping cover 66 and the base structure 116 is determined by the key slot 86, the key 102 and the key groove 136 (see FIG. 8). The complete chain of angularity positioning elements from the disc spring 44 to the base structure 116 is also achieved because the angular relationship between the lifting member 64 and the base structure 116 is determined by the arm 72*a* (see FIG. 9) and the corresponding groove of the recess 124 in the base plate 118 (see FIG. 5). The angular relationship between the base structure 116 and the rotor 22 is determined by the slots 144 (see FIG. 7) of the central sleeve 130 fitting with the mating members of the rotor 22.

Still referring to FIG. 1, in a blade tip grinding process, the fixture assembly 40 is first partially assembled without attachment of the disc spring 42, the top clamping cover 66, the ring 82, the top nut 114 and the central top plate 150. The rotor assembly 20 with blades 24 loosely mounted on the periphery of the rotor 22, is mounted to the partially assembled fixture assembly 40 and the rotor 22 is adequately fitted on the central sleeve 130. The central top plate 150 is then placed on the top side of the rotor 22, allowing the sleeve member 90 and the actuating screw 106 to extend upwardly therethrough. Mounting screws 148 are used to secure the central top plate 150 to the top end of the central sleeve 130 such that the rotor 22 is securely clamped between the radial flange 132 (see FIG. 8) of the central sleeve 130 and the central top plate 150, and is coaxially positioned within the base structure 116. At this point in time the disk may be verified as to the parallelism of concentricity to ensure the perpendicularity of the rotational axis on the table. The disc spring 42 attached with the top clamping cover 66 and the ring 82 is disposed on the top side of the rotor 22, thereby allowing the top portions of sleeve member 90 and actuating screw 106 to extend upwardly through the central opening 84 of the clamping top cover 66. The top nut 114 is then secured to the upper portion of the sleeve member 90. At this stage, the clamping device 63 is adequately mounted to the abase structure 116 and is in contact with the respective disc springs 42, 44, thereby being ready to apply forces to the blades loosely mounted on the rotor 22.

The angular positioning of the respective disc springs 42, 44 with respect to the rotor assembly 20 is automatically completed in the previous mounting steps because of the plurality of angularity positioning elements discussed in the previous paragraph. Nevertheless, in another embodiment of the present invention in which there are no chains of angularity positioning elements provided, efforts must be made at this stage to angularly position the respective disc springs 42, 44 in order to ensure at least each of arms 54 thereof extends toward one blade 24 without interfering with adjacent blades.

An appropriate tool (not shown) is used to firstly apply a small amount of torque to the actuating screw 106 in order to adjust the distance between the lifting member 64 and the clamping top cover 66 into proper axial positions while self-adjusting the respective disc springs 42, 44 such that the outer periphery 48 (see FIG. 2) with the resilient layer 60 of the respective disc springs 42, 44 is in appropriate contact with the axially protruding portion of the platform 30 of individual blades 24 on the opposite axial sides of the rotor assembly 20. In this step, the key 102 functions not only as an angularity positioning element but also as a rotation stop to prevent sleeve member 90 from rotating together with the actuating screw 106. The rotation of the lifting member 64 is prevented by the arms 72 (see FIG. 9) received within the recess 124 (see FIG. 5).

After the disc springs 42, 44 are properly positioned, a predetermined amount of torque is applied to the actuating screw 106 to apply substantially balanced axial forces to the respective disc springs 42, 44, which convert the axial forces into a pair of substantially balanced radial expansion forces acting on the platform 30 of each blade 24 on the opposite sides thereof, thereby resulting in a total radial expansion force acting substantially through a gravitational center of each blade 24 to radially firmly position the blades 24 with respect to the rotor 22. The tool is generally placed on the machine table, then the various parts are installed and verified for accuracy. The remaining parts of the fixture are then assembled and torque is applied to the top nut 114. The blades are thus centered to ensure that they are tight. At this stage the rotor assembly 20 affixed with the fixture assembly 40, is ready to be placed on a running table, for example, of a grinding machine, for machining the outer tips of the blades 24. Before, during and after the grinding process, the outer diameter of the rotor assembly 20 can be conveniently measured by measurement of the difference between one tip and the outer periphery of the gauging ring 146.

The above description is meant to be exemplary only, and one skilled in the art will recognize that changes may be made to the embodiments described without departure from the scope of the invention disclosed. For example, the disc springs may not include cuts to form individual arms as described in the above embodiments. Nevertheless, disc springs without cuts require more axial compressive forces to overcome the resilient deformation of the material. Generally, the disc springs can be replaced by any concave assemblies or cone-like members. These cone-like members can be made from resilient material such as relatively solid rubber, or can have resilient properties due to the combination of the material and configuration thereof, for example, disc springs with or without cuts. However, the cone-like members can also function properly without being resilient if they are configured as toggle joint devices in which individual arms are pivotally mounted at the inner ends thereof, to an inner ring. The lifting member and the base structure may be of various configurations, provided that the base structure 116 securely supports the rotor 22 and operatively supports the clamping device 63. Other angularity positioning elements which mate with a selected part or parts of the rotor configuration may be provided as an alternative to the slots 144 in the flange 132 of the central sleeve 130 (see FIG. 7). Still other modifications which fall within the scope of the present invention will be apparent to those skilled in the art, in light of a review of this disclosure, and such modifications are intended to fall within the appended claims.

The invention claimed is:

1. A fixture assembly for positioning a plurality of blades relative to a rotor of a gas turbine engine, the blade retained in the rotor by loose-fitting dovetail joints, the blades having a dovetail root, an airfoil and a transversely extending platform therebetween, the fixture assembly comprising:

a support for holding said rotor having the blades mounted thereto;

a first positioning member, having a blade engagement portion for contacting a first portion of each blade platform protruding axially relative to the rotor;

a second positioning member disposed so as to be on an opposite axial side of the rotor when the rotor is mounted in the support, the second positioning member having a blade engagement portion for contacting a second portion of each blade platform protruding axially relative to the rotor, the second portion being opposite to the first portion; and a centrally actuatable clamping assembly substantially coaxial to a rotor axis for axially clamping the first and second positioning members together when the rotor is mounted in the support, the first and second positioning members adapted to thereby transmit a pair of outwardly directed radial forces on the respective first and second portions of each of the blade platforms for radially positioning the blades outwardly against the rotor, thereby simulating a centrifugal force resulting from rotor rotation about said rotor axis.

2. The fixture assembly as claimed in claim 1 wherein the first and second positioning members comprise first and second toggle joint devices.

3. The fixture assembly as claimed in claim 2 wherein each of the toggle joint devices comprises a plurality of arms extending toward the respective blades and an inner ring integrated with inner ends of the respective arms, each of the arms having an outer end thereof narrower than a width of an axially protruding portion of one of the blades such that positions of the respective arms are circumferentially adjustable with respect to corresponding blades without interference with adjacent blades when radially positioning the blades.

4. The fixture assembly as claimed in claim 3 wherein the support comprises a base structure including an apparatus for operatively supporting the toggle joint devices and the centrally actuatable clamping assembly, and an apparatus for secure engagement of the rotor with the fixture assembly.

5. The fixture assembly as claimed in claim 4 comprising a plurality of angularity positioning elements disposed between the rotor and base structure, between the base structure and the clamping assembly, and between the clamping assembly and the respective toggle joint devices such that the arms of the toggle joint devices are positioned in a predetermined angular relationship with the respective blades when the rotor is engaged with the fixture assembly, thereby resulting in a total radial expansion force acting substantially through a gravitational center of the respective blades when the opposite axial forces are applied to the respective toggle joint devices.

6. The fixture assembly as claimed in claim 5 wherein the clamping assembly further comprises a first clamping member disposed on a first axial side of the rotor and the blades and contacting the inner ring of the first toggle joint device, a second clamping member disposed on a second axial side of the rotor and the blades and contacting the inner ring of the second toggle joint device, and an actuator operatively connecting with the first and second clamping members to adjust the distance between the first and second clamping members thereby axially compressing the first and second toggle joint devices.

7. The fixture assembly as claimed in claim 6 wherein the base structure comprises a base plate and a central sleeve attached thereto, a cavity defined within the base plate and the central sleeve accommodating at least partially the second clamping member and allowing axial movement of the second clamping member relative to the base structure.

8. The fixture assembly as claimed in claim 7 wherein the base structure further comprises a central plate releasable attached to an end of the central sleeve for securely engaging the rotor with the fixture assembly when the central sleeve extends through a central bore of the rotor, the central plate defining a central bore extending therethrough to allow a part of the first clamping member operatively connected to the actuator to be axially slidably inserted into the central sleeve.

9. The fixture assembly as claimed in claim 8 wherein the rotor is substantially co-axial with the central sleeve when the central sleeve extends through the central bore of the rotor and wherein the first and second clamping members are adjustable about a central axis of the central sleeve when contacting but not clamping the respective first and second toggle joint devices.

10. The fixture assembly as claimed in claim 6 wherein the actuator comprises a bolt having first and second threaded sections defining threads in opposite rotational directions, respectively, the first and second threaded sections operatively engaging a complementary threaded section of the respective first and second clamping members.

11. The fixture assembly as claimed in claim 4 wherein the first and second toggle joint devices are self-adjustable about a central axis of the base structure during a clamping action by the clamping assembly to ensure substantially even radial forces applied to the individual blades.

12. The fixture assembly as claimed in claim 11 wherein the base structure comprises a base surface adapted to be placed on a turning table of a machine, the central axis of the base structure being substantially perpendicular to the base surface.

13. The fixture assembly as claimed in claim 4 wherein the base structure comprises a gauging ring providing a reference for measuring an outer diameter of the rotor assembly defined by tips of the blades when the blades are radially and firmly positioned with respect to the rotor.

14. The fixture assembly as claimed in claim 3 wherein each of the arms of the respective toggle joint devices comprises a layer of resilient material on the outer end thereof to ensure a firm contact of the arm with the axially protruding portion of one of the blades when radially positioning the blades.

15. The fixture assembly as claimed in claim 14 wherein the resilient layers on the respective arms of each of the toggle joint devices are connected one with another to form an integral outer ring of the resilient material attached to the toggle joint device.

16. The fixture assembly as claimed in claim 1 wherein the first and second positioning members comprise first and second disc springs.

17. The fixture assembly as claimed in claim 16 wherein each of the disc springs comprises a plurality of circumferentially spaced cuts through a thickness thereof, the cuts extending radially and inwardly from the outer periphery of each of the disc springs.

18. The fixture assembly as claimed in claim 17 wherein the number of cuts in each of the disc springs is equal to the number of blades.

19. The fixture assembly as claimed in claim 16 wherein the blade engagement portion comprises a plurality of arms, at least one extending toward each of the blade platforms.

20. The fixture assembly as claimed in claim 16 wherein the blade engagement portion comprises a periphery of the disc spring.

21. The fixture assembly as claimed in claim 1 wherein the first and second positioning members comprise first and second resilient cones.

22. The fixture assembly as claimed in claim 21 wherein the blade engagement portion comprises a periphery of the resilient cones.

23. The fixture assembly as claimed in claim 1 further comprising means for operatively supporting the centrally actuable clamping assembly and securely supporting the rotor and blades, thereby providing a base of the fixture assembly to be placed on a grinding machine.

24. A fixture assembly for a rotor assembly, the rotor assembly including a rotor disc having an axis of rotation and a plurality of airfoil blades mounted to a periphery of the rotor by respective loose-fitting dovetail joints, the fixture assembly comprising:

an axle adapted to centrally support the rotor assembly;

first and second clamping members associated with the axle, the clamping members adapted to be moved towards one another to thereby provide a clamping force therebetween; and first and second concave assemblies mounted to the axle and positioned such that a central concave surface of each concave assembly faces the rotor, the concave assemblies disposed on opposite sides of the rotor relative to one another, the first and second concave assemblies each extending from the axle to engage opposite sides of the airfoil blades at respective peripheries of the first and second concave assemblies, the first concave assembly associated with the first clamping member and the second concave assembly associated with the second clamping member;

wherein, when a rotor assembly is installed in the fixture assembly, movement of the clamping members towards one another tends to reduce respective concavities of the first and second concave assemblies and thereby generate a outwardly-directed radial force at the respective peripheries of the first and second concave assemblies, in order to radially secure the airfoil blades relative to the rotor disc.

25. The fixture assembly as claimed in claim 24 wherein the first and second concave assemblies comprise first and second disc springs.

26. The fixture assembly as claimed in claim 24 wherein the first and second concave assemblies comprise first and second toggle joint devices, each of the toggle joint devices including a plurality of arms integrated at inner ends thereof with an inner ring.

* * * * *